US008443827B2

(12) United States Patent
Rüb

(10) Patent No.: US 8,443,827 B2
(45) Date of Patent: May 21, 2013

(54) CONTROLLING DEVICE FOR HYDRAULIC CONSUMERS

(75) Inventor: Winfried Rüb, Waldshut-Tiengen (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 580 days.

(21) Appl. No.: 12/448,417

(22) PCT Filed: Oct. 26, 2007

(86) PCT No.: PCT/EP2007/009295
§ 371 (c)(1),
(2), (4) Date: Nov. 20, 2009

(87) PCT Pub. No.: WO2008/083772
PCT Pub. Date: Jul. 17, 2008

(65) Prior Publication Data

US 2010/0065135 A1 Mar. 18, 2010

(30) Foreign Application Priority Data

Dec. 22, 2006 (DE) ......................... 10 2006 061 305

(51) Int. Cl.
*G05D 7/00* (2006.01)

(52) U.S. Cl.
USPC ................. 137/106; 137/118.04; 137/119.02; 137/115.22; 137/87.05; 91/436

(58) Field of Classification Search
USPC .................. 137/106, 118.04, 119.02, 115.22, 137/87.05, 625.18; 91/436; 60/422
See application file for complete search history.

(56) References Cited

U.S. PATENT DOCUMENTS 3,916,768 A * 11/1975 Martin ........................ 91/417 R
3,979,908 A * 9/1976 Alderson ........................ 60/422
3,981,228 A * 9/1976 Maucher ........................ 91/415
4,089,167 A * 5/1978 Budzich .......................... 60/427
4,114,516 A * 9/1978 Johnson .......................... 91/420
4,192,337 A * 3/1980 Alderson et al. .............. 137/101
4,367,763 A * 1/1983 Brand ........................... 137/106
4,712,375 A * 12/1987 Kauss et al. .................... 60/405
4,768,339 A * 9/1988 Aoyagi et al. .................. 60/427
5,165,233 A * 11/1992 Betz ................................ 60/488
5,400,816 A * 3/1995 Gerstenberger .............. 137/106
5,782,260 A * 7/1998 Jacobs et al. ............. 137/118.02
(Continued)

FOREIGN PATENT DOCUMENTS

DE 38 23 892 A1 1/1990
DE 42 43 578 A1 6/1994
(Continued)

*Primary Examiner* — Stephen M Hepperle
*Assistant Examiner* — Minh Le
(74) *Attorney, Agent, or Firm* — Roylance, Abrams, Berdo and Goodman LLP

(57) ABSTRACT

A controlling device for hydraulic consumers (10, 12) has one controlling valve (18) for controlling a supply pipeline ($T_{Reg}$) for the hydraulic consumer (10, 12) and a tank return pipeline ($T_{RO}$). Because the control valve (18) is connected to an additional supply pipeline ($T_R$) and constructed as a priority valve, the supply pipeline ($T_{Reg}$) receives priority preference of a fluid supply system over the priority of the tank return pipeline ($T_{RO}$). A sensor circuit is realized which checks whether, in accordance with the load situation at the hydraulic consumer (10, 12), there is any need at all for a supply flow.

22 Claims, 6 Drawing Sheets

U.S. PATENT DOCUMENTS

| | | | | | |
|---|---|---|---|---|---|
| 5,907,991 | A * | 6/1999 | Ramamoorthy et al. | 91/436 |
| 5,960,814 | A * | 10/1999 | Kot | 137/87.01 |
| 6,116,143 | A * | 9/2000 | Scheffel | 91/436 |
| 6,170,508 | B1 * | 1/2001 | Faust et al. | 137/12 |
| 6,327,959 | B1 * | 12/2001 | Takahashi et al. | 91/436 |
| 6,701,823 | B2 * | 3/2004 | Weber et al. | 91/436 |
| 2003/0121256 | A1 * | 7/2003 | Mather | 60/422 |

FOREIGN PATENT DOCUMENTS

| | | | |
|---|---|---|---|
| DE | 43 42 487 | A1 | 6/1995 |
| DE | 43 42 487 | B4 | 6/1995 |
| DE | 197 35 482 | A1 | 2/1999 |
| EP | 1 170 510 | A2 | 1/2002 |
| JP | 61 165432 | A | 7/1986 |

* cited by examiner

CONTROLLING DEVICE FOR HYDRAULIC CONSUMERS

FIELD OF THE INVENTION

The invention relates to a controlling device for hydraulic consumers with at least one control valve for controlling a supply line for the respective hydraulic consumer and with a tank return line.

BACKGROUND OF THE INVENTION

Controlling devices such as these are used in particular as mobile directional control valves for controlling hydraulic consumers, such as, for example, working cylinders and hydraulic motors. Some of these consumers always experience the same direction of force of the external load. Other loads change the direction of their force in operation. The lifting cylinder of a fork lift always experiences a force directed downward, whereas the hydraulic motor of a slewing gear during acceleration can experience a compressive load and, upon braking, a pulling load because the inert mass of the slewing gear continues to run in the original drive direction.

If, at this point, pulling loads move the consumer more quickly than corresponds to the volumetric flow amount in the supply line, the inlet pressure drops rapidly down to the cavitation pressure and below. This occurrence is to be fundamentally prevented.

To counter this, readily available control devices can be purchased on the market which ensure that the cavitation pressure is always reached for the indicated suction action of pulling loads. In the known solutions fluid is supplied by an additional feed system to the respectively endangered pressure line as the supply line. This supply only takes place when the feed pressure applied by this feed system is greater than the pressure in the endangered supply line plus the sum of all pressure drops at the installed throttle points from the supply line to the endangered line. An additional pump system is often encountered as an additional feed system in hydrostatic drives. One option, which is more economical in comparison, arises when the fluid backflow to the tank as a pressure chamber is retained in conventional valve controls by a tank back pressure valve as the control valve. The required supply volume is then taken from this pressure chamber. The disadvantage in these known solutions is the continuing energy loss resulting from the additionally required pump delivery amount and the set back pressure or working capacity of the hydraulic consumer which essentially has been reduced by the back pressure.

To at least partially remedy this, DE 43 42 487 B4 discloses a hydrostatic drive system with a consumer of hydraulic energy supplied on both sides and located in an open circuit. The two ports of the consumer are assigned at least one brake valve with a replenishing valve dynamically connected to it. The replenishing valve enables supply of a hydraulic medium from the outlet side to the inlet side of the consumer. In the known solution, the replenishing valve, in the braking phase in which the brake valve can produce an outlet-side pressure, can be preloaded to an increased replenishing pressure by the pressure produced on the outlet side in the braking phase. In the normal operating state, fluid hydraulic medium can then escape without great resistance by the replenishment valve to the tank. In the braking phase, the replenishment valve is automatically preloaded to a higher opening pressure so that due to the increased replenishment pressure level, external supply to the hydrostatic driving system can be omitted. In this respect, for the known solution the necessity of providing an additional pump system as an auxiliary pump for maintaining a specific inlet-side pressure level is obviated. However, the known solution with a control valve in a double piston execution is complex and therefore expensive to produce.

DE 42 43 578 A1 discloses commercial vehicle hydraulics, in particular for a refuse collection vehicle, with at least one hydraulic circuit. Various actuating elements are connected to that circuit for performing various functions, for example, opening the rear part, lifting and tipping a dumpster, etc. The known solution also has a pump driven by a motor or a secondary output of the commercial vehicle, coupled to it for conveying hydraulic oil into the hydraulic circuit. The pump is designed such that its delivery rate can be controlled at least partially independently of the engine speed. With the known solution, using a control means to determine the power demand of the actuating members connected to the hydraulic circuit, the delivery rate of the pump can always be set such that the engine speed of the commercial vehicle remains as low as possible and is raised only when the power demand is higher. This arrangement helps avoid energy losses.

DE 197 35 482 A1 discloses a hydraulic system with a differential cylinder with a piston rod and piston separating the piston rod-side pressure chamber and the pressure chamber remote from the piston rod from one another. By a directional control valve with two consumer ports, the two pressure chambers of the differential cylinder can be connected alternately to a source of hydraulic medium and to a tank. Independently of this directional control valve, by a quick operating valve, the piston rod-side pressure chamber can be connected to the pressure chamber remote from the piston rod of the differential cylinder. In the known solution, when the quick operating valve is actuated in the rest position or the working position of the directional control valve in which the pressure chamber of the differential cylinder remote from the piston side is supplied with hydraulic medium from the source of a hydraulic medium, collapse of the load is prevented by a check valve located in the connection established by the quick operating valve between the two pressure chambers of the differential cylinder and blocking from the pressure chamber remote from the piston rod to the piston rod-side pressure chamber. The known solution, irrespective of the magnitude of the load being moved with the differential cylinder and counteracting the extension of the piston rod, allows arbitrary actuation of the quick operating valve without endangering anyone and without the risk of damage to the machine so that at any instant a quick traverse motion is possible.

SUMMARY OF THE INVENTION

An object of the invention is to provide an improved controlling device for hydraulic consumers such that in a reliable, energy saving and economical manner harmful cavitations are reliably prevented in any application.

This object is basically achieved with a controlling device where a control valve is connected to an additional feed line and is designed as a priority valve such that the supply line acquires preference of fluid supply over the tank return line. A sensor circuit checks whether, depending on the load situation on the hydraulic consumer, there is any demand for supply flow at all. Only when this demand is “sensed” by the sensor circuit, the tank return line is dammed to a required pressure level, and the required inlet pressure in each individual case is maintained such that the cavitation pressure is, in any case, exceeded. This arrangement also leads to energy saving effects. The solution according to the invention manages with few components and is thus economical to produce and maintain. The use of additional brake valves, as is shown in the prior art, can be omitted. As a result of the mechanically simple structure, reliable operation for each load state is also ensured. Preferably, the sensor circuit is implemented using a compensator as the control valve.

The control valve for the controlling device according to the invention is designed as a priority valve which, as a tank back pressure valve, gives preference to the indicated supply line over the free tank return line. Preferably, a check valve located between the supply line and the feed line and opening in the direction of the supply line prevents inadvertent backflow from the supply line into the feed line.

A second feed line can be provided for additional and direct supply of the supply line. Preferably the second feed line in the control valve can be influenced by the control edge of the valve piston and can be blocked by the control stroke of the control spring of the control valve such that the connection to the supply line is interrupted. Preferably, the second feed line begins in a channel of the pressure supply and is determined by a defined throttle point in its flow behavior.

The control behavior of the controlling device can be improved by a continuously throttled relief line from the supply line into the free tank return line.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
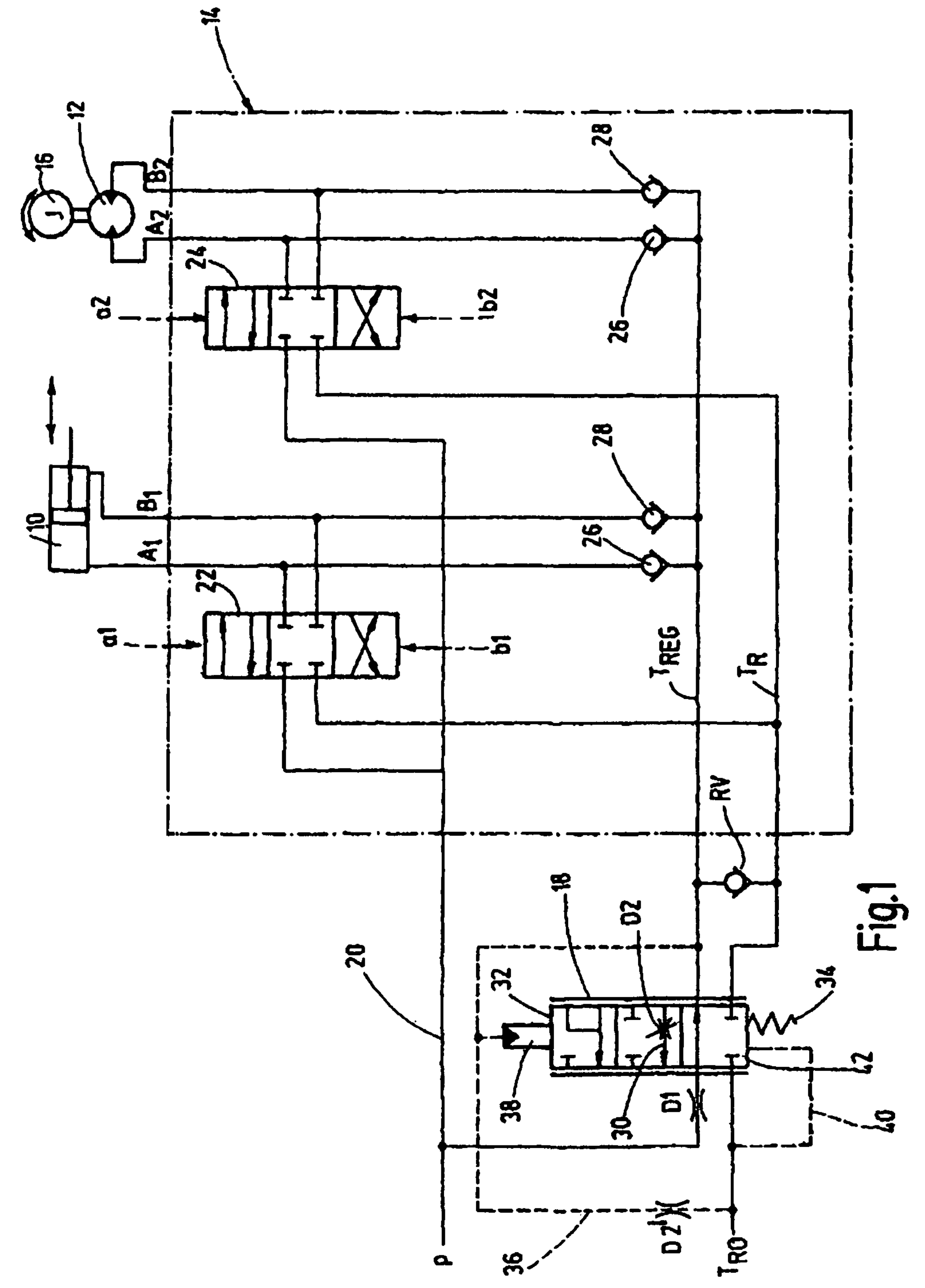
FIG. 1 is a circuit diagram of a controlling device for hydraulic consumers according to an exemplary embodiment of the invention.

FIG. 1 shows the controlling device for hydraulic consumers as a circuit diagram. This circuit diagram is only exemplary. Other possible embodiments are conceivable. The hydraulic consumers can be a working cylinder 10 and a hydraulic motor 12. The working cylinder 10 is connected with its piston chamber to carry fluid to a utility port $A_1$ and with its rod side to a utility port $B_1$. Likewise, the hydraulic motor is connected to utility ports $A_2$, $B_2$. All utility ports $A_1$, $B_1$, $A_2$, $B_2$ form the respective output of a control block 14.

The illustrated working cylinder 10 can be, for example, a component of a machine in the form of a wheel loader or the like for raising or lowering an implement in the form of a conventional lifting mechanism with a blade. The hydraulic motor 12, for example, drives a mechanical slewing gear 16 on the basis of a moment of inertia J. With the respective hydraulic motors 12, for example, hydraulic lifts can be actuated, running gears of machinery such as fork lifts can be driven, and the like. The possible uses both for hydraulic working cylinders and for hydraulic motors are virtually unlimited. As the double arrows for the working cylinder 10 and the hydraulic motor 12 symbolically show, both the working motion of the piston rod unit of the working cylinder 10 and the direction of rotation for the hydraulic motor 12 can be reversed. For the hydraulic motor 12 that when the slewing gear 16 is being driven in one direction, upon acceleration it experiences a compressive load, while in braking a pulling load is formed because the inert mass (moment of inertia J) of the slewing gear 16 continues to move. The situation is comparable on the working cylinder 10 when a load is compressed in one direction and in the other, opposite direction must be pulled analogously for a retraction motion. Fundamentally, when pulling loads move the respective consumer 10, 12 more quickly than corresponds to the volumetric flow in the inlet channel flowing in on the utility ports $A_1$, $B_1$, $A_2$, $B_2$, the inlet pressure then can drop quickly to the cavitation pressure and below. This situation is to be avoided due to damaging effects. The controlling device of the invention serves this purpose.

The controlling device for this purpose has a control valve 18 which, among other purposes, is used to control a supply line $T_{Reg}$ for the respective hydraulic consumer 10, 12. Diametrically opposite to the output-side supply line $T_{Reg}$, the tank return line $T_{RO}$ is also connected to the control valve 18 on the input side. Another output of the control valve 18 is connected to an additional feed line $T_R$. The control valve 18 is designed as a priority valve such that the supply line $T_{Reg}$ acquires preference of fluid supply over the tank return line $T_{RO}$.

A hydraulic pump of conventional design, not detailed, is used for fluid supply or pressure supply p. The pressure supply p in turn is connected by way of a throttle $D_1$ to the input side of the control valve 18. The pressure supply p discharges into a secondary branch 20 to the input side of two other control valves 22, 24. One or first control valve 22 on the output side is connected with its fluid ports to the utility ports $A_1$, $B_1$ of the hydraulic cylinder 10. The second, other control valve 24 is connected analogously to the utility ports $A_2$, $B_2$ of the hydraulic motor 12. The respective valve 22, 24 is moreover connected on the input side in a fluid-carrying connection to the feed line $T_R$. The two outputs leading to the respective utility ports $A_1$, $B_1$, $A_2$, $B_2$ are connected by a fluid line to the supply line $T_{Reg}$.

Two check valves 26, 28 at a time are connected into the pertinent fluid lines. The check valve 28 which leads to the utility port $B_1$, $B_2$ is provided with a pressure limitation function. All the check valves 26, 28 open in the direction of their respectively assignable utility ports $A_1$, $B_1$, $A_2$, $B_2$. The other, second control valves 22, 24 are designed as 4/3 directional control valves and are shown in their middle unactuated positions in which the respective input side is separated from the output side. The respective 4/3 directional control valve can be controlled hydraulically or electrohydraulically in the conventional manner by opposing control ports $a_1$, $b_1$ and $a_2$, $b_2$. These 4/3 directional valves can also be optionally replaced by other valve constructions. In addition to the illustrated working cylinder 10 and the hydraulic motor 12, other consumers of the same type or different type can be used. The control block 14 also can be used solely for controlling a hydraulic consumer 10 or 12.

As follows from FIG. 1, between the supply line $T_{Reg}$ and the feed line $T_R$ a check valve RV is connected to open in the direction of the supply line $T_{Reg}$. The control valve 18 has an internally extending second feed line 30 influenced by a second throttle D2. The respective details will be explained using the sectional views of FIGS. 2-6. The valve piston 32 of the control valve 18 is supported against a control spring 34 in the form of a compression spring. As also shown in FIG. 1, between the tank return line $T_{RO}$ and the supply line $T_{Reg}$ a continuously throttled relief line 36 is connected, preferably having another defined throttle site D2'. The relief line 36 discharges onto the control side 38 of the control valve 18 located opposite the control spring 34, and acts on the valve piston 32. In addition to the control spring 34, another branch line 40 from the free tank return line $T_{RO}$ discharges onto the other control side 42 of the control valve 18. The possible working positions assumable by the control valve 18 is the subject matter of the sectional view descriptions to be explained relative to FIGS. 2 to 5.

The controlling device show in FIG. 1 is designed as a sensor circuit which "senses" whether there is a demand for a supply flow for the respective consumer 10, 12. Only if this demand is "sensed" is the free tank return line $T_{RO}$ restricted to the required pressure level. The two independent return lines in the control block 14 are used for this purpose. One, in this connection, is formed by the feed line $T_R$ for the control valve 18; the other is the supply line $T_{Reg}$ to the supply valves made as check valves 26, 28. The control valve 18 accordingly forms a type of tank back pressure valve and is designed as a priority valve giving preference in terms of fluid supply to the supply line $T_{Reg}$ over the free tank return line $T_{RO}$.

The sensor circuit relieves the tank return line $T_{RO}$ as long as a supply demand is not indicated. Otherwise the tank return line $T_{RO}$ is throttled to a mechanically predetermined level dictated essentially by the spring force of the control spring 34. As long as there is no quantitative outflow in the supply line $T_{Reg}$, the fluid is routed unthrottled into the tank return line $T_{RO}$. If, in contrast, a supply stream flows out, the control valve 18 then continues to control the mechanically set pressure in the supply line $T_{Reg}$ by throttling the outflow to the free tank return line $T_{RO}$. In this way at the same time, the pressure in $T_R$ raises above that in the supply line $T_{Reg}$, and the fluid medium now has to flow into the supply line $T_{Reg}$ through the check valve RV. To implement the sensor, the pressure area active at the time on the valve piston 32 of the control valve 18, designed as a compensator, is used. According to the circuit diagram shown in FIG. 1, the control valve 18 is made preferably as a 4/3 directional control proportional valve with the formation of the compensator.

Figure 2:
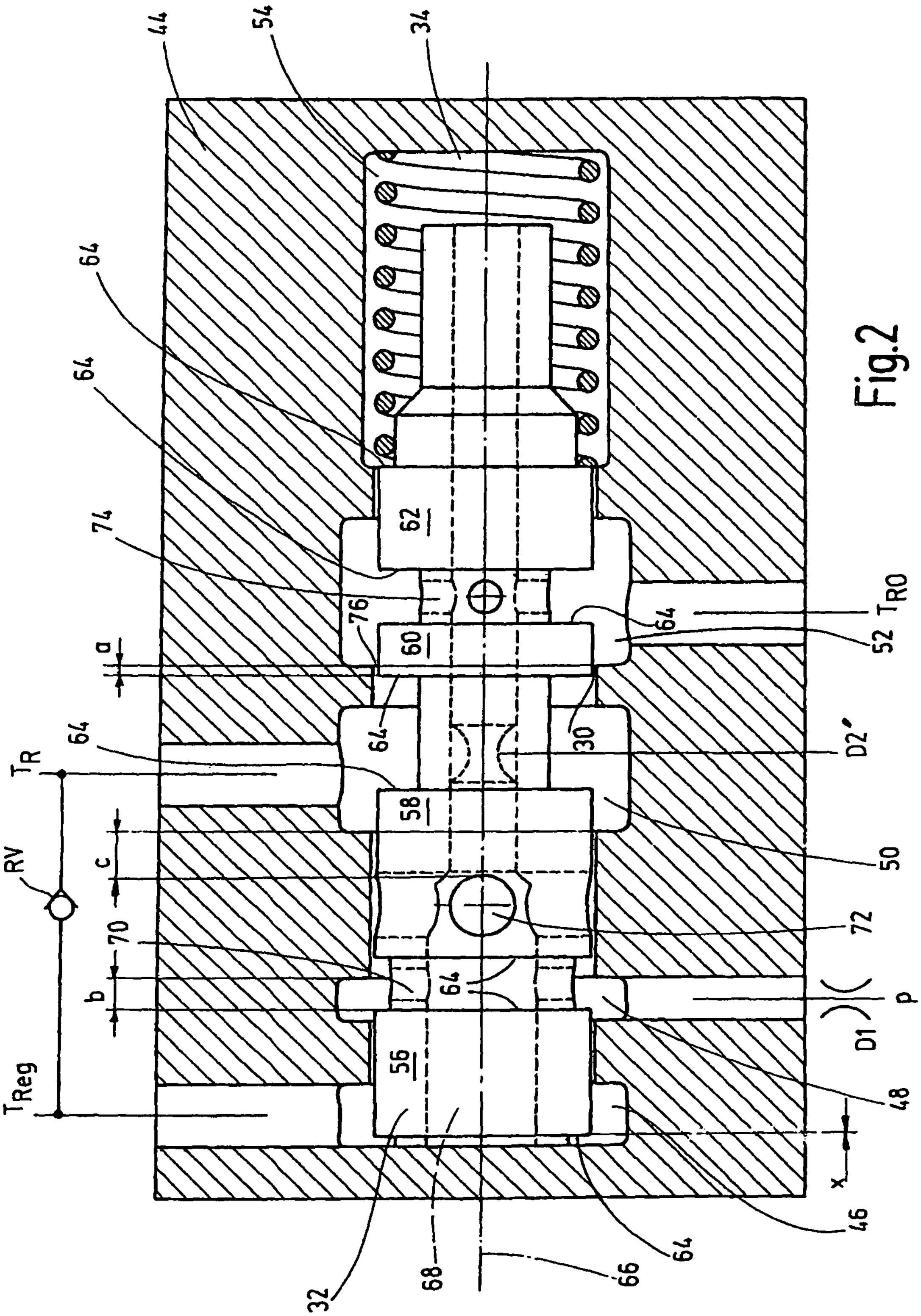
FIGS. 2 to 5 are side elevational views in section of the controlling valve of FIG. 1 in different operating positions.
Figure 6:
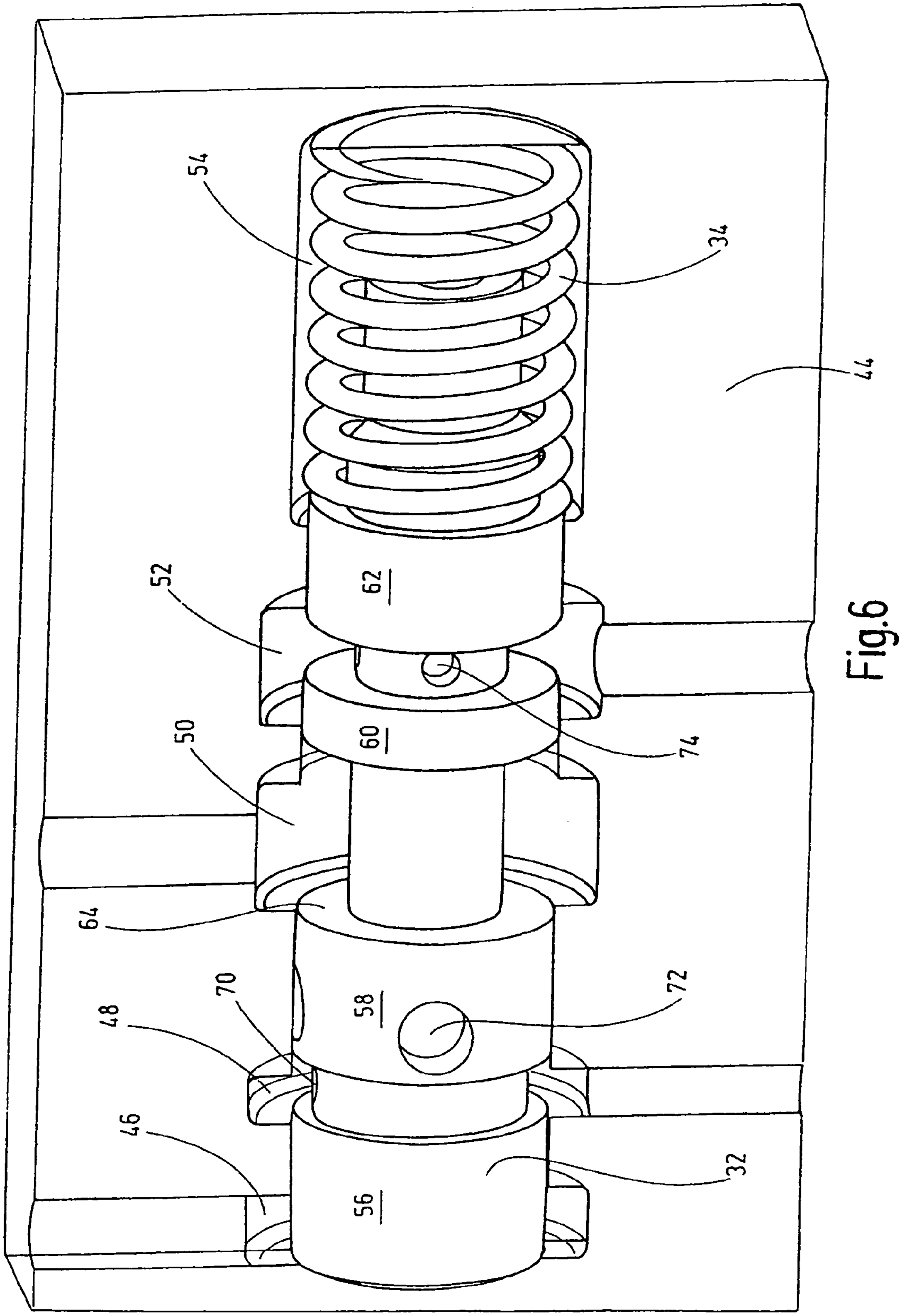
FIG. 6 is a perspective view of the control valve shown cutaway as in FIGS. 2 to 5.

The control valve is shown in detail in the following figures using various working positions. FIG. 2 shows the operating diagram of the valve as shown in FIG. 6, i.e., viewed in the direction of FIGS. 2 and 6. The control piston or valve piston 32 is guided within the valve housing 44 and is in its left-most operating position in which on the left side it strikes the wall of the valve housing 44. In the valve housing 44, several annuli 46, 48, 50, 52, and 54 are widened in their circumference. The last annulus 54, among other purposes accommodates the control spring 34 formed as a compression spring 34. Viewed from left to right, the supply line $T_{Reg}$ discharges into the first annulus 46, and the pressure supply p is connected to the second annulus 48 with the throttle site D1. The feed line $T_R$ discharges into the following third annulus 50. The free tank return line $T_{RO}$ is connected to the following fourth annulus 52.

The individual annuli 46, 48, 50, 52, and 54 are separated essentially fluid-tight from one another by piston segments 56, 58, 60, and 62. These piston segments 56, 58, 60, and 62 are widened in diameter relative to the remaining diameter of the valve piston 32 to form active annular piston surfaces. In the left-hand stop position shown in FIGS. 2 and 6 for the valve piston 32, individual coverings of the valve piston 32 designated as a, b, c in the valve housing 44 are reproduced. In this working position $a<b<c$ applies. With respect to this left-hand stop position, the free path x of motion for the valve piston 32 in the possible direction of motion to the right is equal to 0. The valve piston 32 is penetrated along its longitudinal axis 66 by a longitudinal hole or bore 68 discharging into the open on both sides of the valve piston 32 to the exterior of the valve piston 32, that is, into the first annulus 46 and into the fifth annulus 54.

Between the first piston segment 56 and the second piston segment 58 a transverse hole 70 discharges into the second annulus 48 in the illustrated working position shown in FIG. 2 and is connected to carry fluid to the longitudinal hole 68 in the form of a longitudinal channel. For this purpose, offset 90° in the plane of the figure, a second transverse hole or bore 72 of larger diameter than part of the longitudinal hole 68 in the direction of the valve housing 44 emerges from the second piston segment 58. A third transverse hole or bore 74 discharges into the fourth annulus 52 between the piston segments 60 and 62. To the extent transverse holes are described, each transverse hole 70, 72, 74 can also comprise several, in particular four, channel segments located vertically on top of one another.

The transverse hole arrangements following one another in the longitudinal plane each can be located and extend angularly offset to one another by 90° and adjacent to one another. As shown in FIG. 2, within the longitudinal hole 68 in the piston section between the second piston segment 58 and the third piston segment 60 is the third throttle site D2'. To form a good contact surface for the control spring 34, the valve piston 32 on its right end as viewed in FIG. 2 is designed with steps. The outside diameter of all piston segments is the same. The active piston surfaces 64 are, however, made differently from one another in diameter, with the piston surfaces 64 of two piston segments 56 and 58, 58 and 60, and 60 and 62, adjacent to one another having the same active piston surface 64.

FIGS. 2 and 6 essentially relate to the supply position as a possible working position of the controlling device according to the invention. The throttles D1 and D2 should be closed in terms of a theoretical assumption. In the unpressurized state, the valve spring 34 presses the control piston 32 against the mechanical stop in the form of the inner wall of the valve housing 44. In this connection, the fluid-carrying connection between $T_R$ and $T_{RO}$ is blocked. If at this point the hydraulic pump is turned on and a fluid pressure p is in the second annulus 48, in the supply channel $T_{Reg}$ there is no hydraulic resistance, with the result that the working medium flowing in the return line travels by way of the valve RV unpressurized via the supply valves 26, 28 to the hydraulic consumers 10, 12. This operating state prevails for pulling loads. If there are no longer any pulling loads, the supply valves 26, 28 close and the volumetric flow ceases. The pressure in $T_{Reg}$ and $T_R$ rises.

Figure 3:
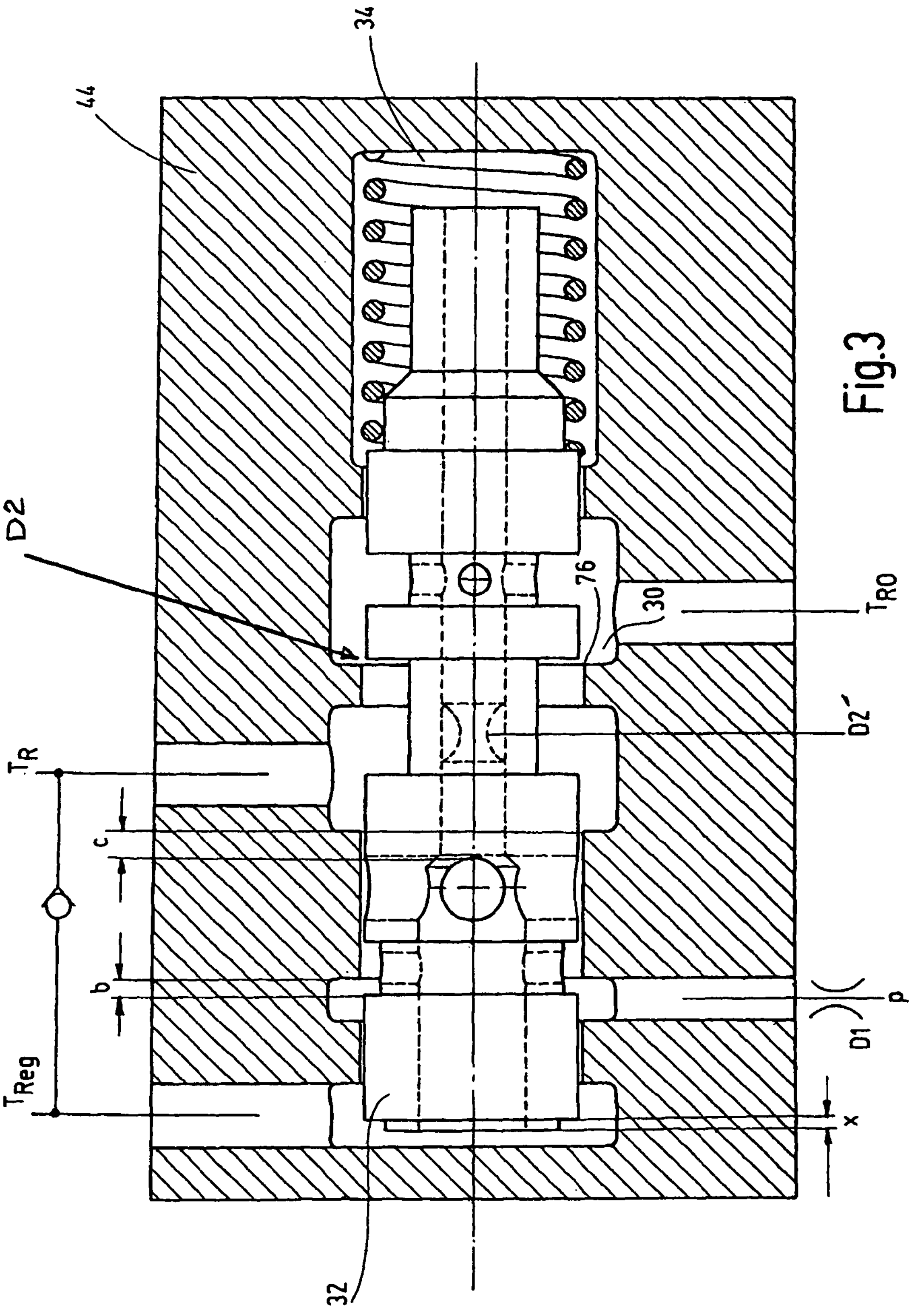

If the compressive force acting on the control piston 32 becomes higher than the force of the control spring 34, the control piston 32 moves against the spring 34. In the process, the connection from $T_R$ to $T_{RO}$ is opened, and the feed pressure $T_R$ and the pressure in the supply line $T_{Reg}$ drop. At this point, a control motion begins with the objective of setting the pressure in $T_{Reg}$ exactly to the force of the control spring 34 as the valve spring. The pressure in the feed line $T_R$ cannot drop below the corresponding pressure value of the control spring 34 so that the return line $T_{RO}$ is always preloaded. FIG. 3 corresponds to the operating state when $a<x<b$. Since in the operating diagram as shown in FIG. 3 supply by way of the supply valves 26, 28 does not take place, there is no consumption, and the fluid pressure in the free tank return line $T_{RO}$ is maintained by controlling means.

In the already addressed theoretical operating sequence, the throttle D1 is now to be opened. The $T_{Reg}$ fluid-carrying channel as the supply line is then supplied not only by way of the valve RV by $T_R$, but also by way of the throttle D1, proceeding from a high pressure level, for example, in the form of the pump supply pressure p. If at this point no pulling loads occur, the valve piston 32 moves in turn to the right, as viewed in the figure, against the spring 34. In so moving, within the valve a fluid-carrying connection from $T_R$ to the unpressurized return line $T_{RO}$ occurs. This connection causes the pressure in $T_R$ to drop. The valve RV closes because the supply line $T_{Reg}$ is supplied additionally by way of the throttle D1, and a volumetric flow does not escape. The pressure in the supply line $T_{Reg}$ then remains at a level corresponding to the amount of the force of control spring 34.

Figure 5:
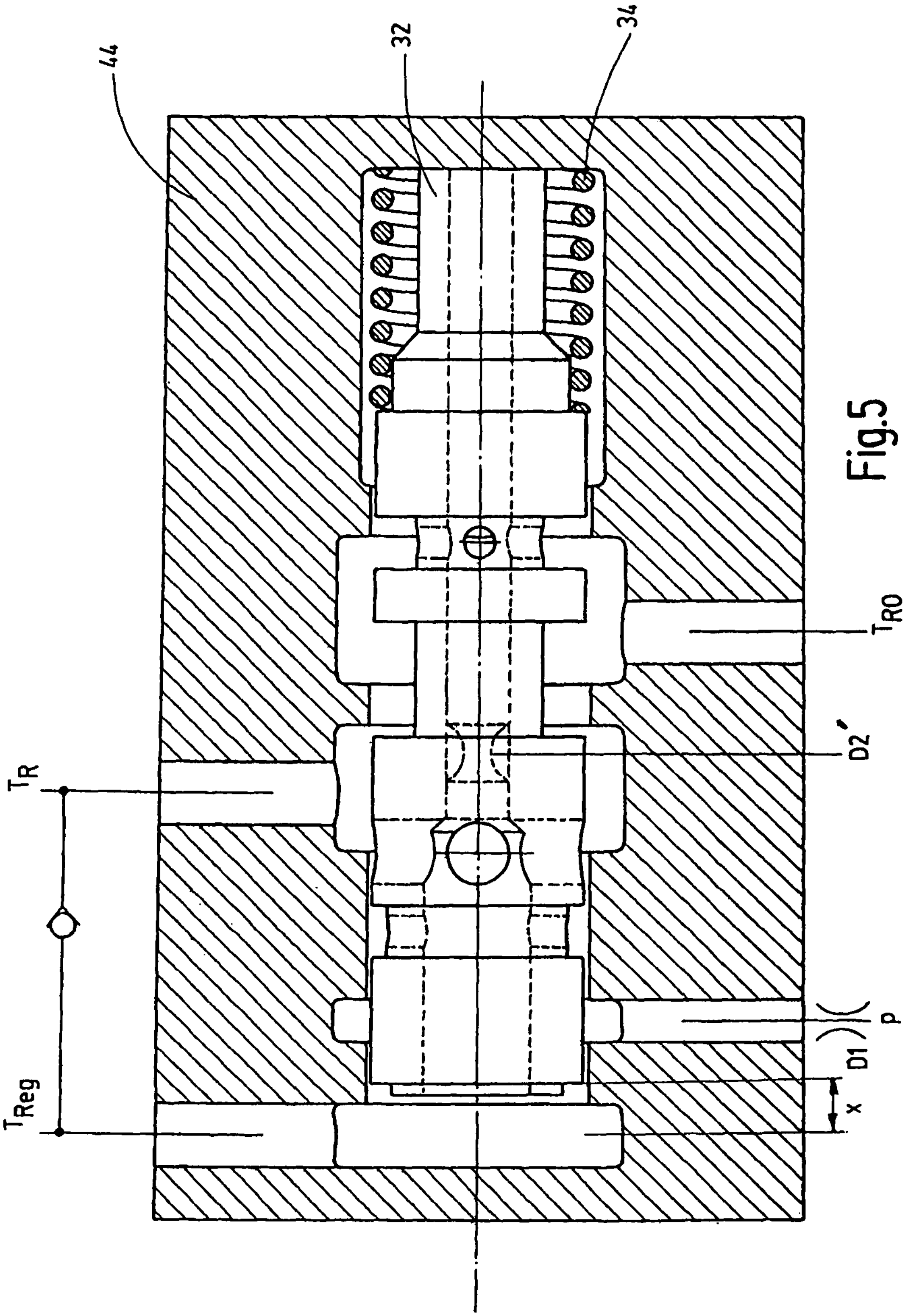

The control piston or valve piston 32 can then move completely against the control spring 34 without feed pressure being taken from $T_R$. When the connection $T_R$ to $T_{RO}$ is completely opened, the pressure at $T_R$ drops to the level of $T_{RO}$. If the valve piston 32 were to move against the spring 34 as far as the mechanical stop, the pressure in the supply line $T_{Reg}$ would change to the level of the inlet pressure in the second feed line 30. This valve state is shown in FIG. 5 with x=c. The respective supply valves 26, 28 would then optionally open and would feed in an undesirable manner into the consumer ports $A_1$, $B_1$, $A_2$, $B_2$. To prevent this occurrence, the pressure in the supply line $T_{Reg}$ does not increase above the preset level of the spring force of the control or valve piston 32 so that the control piston 32 closes the inlet of the second feed line 30 before the mechanical stop is reached. A control motion will then commence oscillating around the position of the control edge 76 (FIG. 2) of the valve housing 44.

Figure 4:
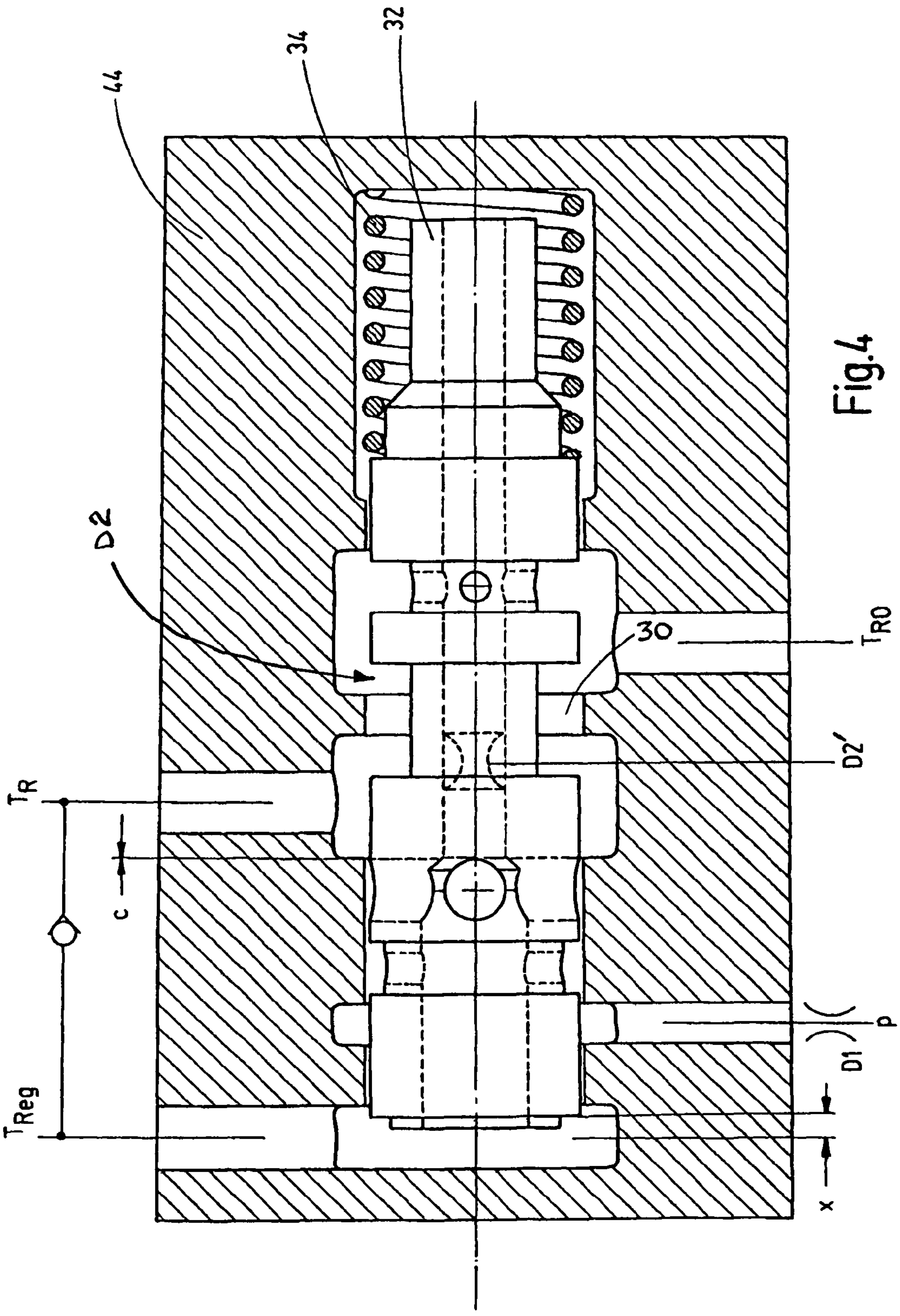

When pulling loads act on the respective consumer 10, 12, the control valve 18 as the tank back pressure valve blocks the outflow into the free tank return line $T_{RO}$, and the control edge 76 of the second feed line 30 is completely opened. So that at this point some arbitrary amount of volumetric flow is not taken from the high pressure level, the inlet of the second feed line 30 is safeguarded with the throttle D2. To prevent the control motions from leading to vibrations, an opened third throttle site D2' is in the relief line 36. This arrangement results in a small control oil loss from $T_{Reg}$ to $T_R$ acting on the control valve 18 in a stabilizing manner and is negligibly small with respect to the implemented energy savings effects. The operating diagram as shown in FIG. 4 reproduces the situations when $b<x<c$ with $T_{RO}$ being open and the pressure limitation function (DBV) for the supply line $T_{Reg}$ being closed.

The level of control oil consumption is determined by the level of the force of the control spring 34 and the throttle action of D'. Typical design specifications vary between pressure preloading of 10 bar, combined with D' equal to 0.8 mm and pressure preloading of 7 bar, obtained from two successively connected throttles of 0.6 mm as D'. The control oil consumption of 1 l/min to 0.34 l/min can be easily varied for each design. The assigned energy losses are then dependent on the current pump pressure p supplying the second feed line 30 at the same time. For an average pump pressure of 200 bar, losses of 0.3 KW and 0.1 KW then occur.

If for some reason a volumetric flow is additionally supplied to the supply line $T_{Reg}$, for example, originating from the pressure limitation valves on the pipe ports, this additional volumetric flow must not lead to impermissible pressure piling in the supply line $T_{Reg}$. This additional volumetric flow must be reliably discharged. For this purpose, the tank back pressure valve in the form of the control valve 18 can route its stroke until a connection of the supply line $T_{Reg}$ to the feed line $T_R$ opens, the feed line $T_R$ being connected already unthrottled to the free tank return line $T_{RO}$.

With the described controlling device, the operating capacity of the hydraulic consumers 10, 12 can be increased if there is no supply state. A pressure increase by 7 to 10 bar is easily possible so that in this respect energy is also saved by this isolated back pressure. The assignable cooling system can also be made smaller due to this saving of energy. Fuel is saved, particularly diesel fuel. The operating capacity of the hydraulic consumer, if there is no supply state, is increased, for example, by 7 to 10 bar. The energy is then saved in the amount of the isolated back pressure of 7 to 10 bar. One typical example is a small excavator with an average volumetric flow of 50 ml/min and 7 bar back pressure in the supply channel. This arrangement yields energy savings of approximately 0.58 kW, of which, however, approximately 0.1 KW control oil loss would have to be subtracted. For a mobile excavator with an average volumetric flow of 200 l/min at a back pressure of 10 bar, even 3.3 KW could be saved. Of this, a maximum of 0.3 KW would again be lost for control oil loss so that the total energy savings would be 3 KW.

While one embodiment has been chosen to illustrate the invention, it will be understood by those skilled in the art that various changes and modifications can be made therein without departing from the scope of the invention as defined in the appended claims.

What is claimed is:

1. A controlling device for hydraulic consumers, comprising:

at least one first control valve in a supply line in fluid communication with at least one hydraulic consumer;

a tank return line in fluid communication with said first control valve;

an additional feed line connected to said first control valve, said first control valve operating as a priority valve such that said supply line acquires preference of fluid supply relative to said tank return line, and a check valve connected between said supply line and said additional feed line and opening in a direction of said supply line.

2. A controlling device according to claim 1 wherein said first control valve is connected to a fluid supply via a first throttle.

3. A controlling device according to claim 1 wherein said first control valve comprises a second feed line with a second throttle and a valve piston therein with a control edge regulating free fluid flow through said second feed line.

4. A controlling device according to claim 3 wherein said first control valve comprises a valve housing and a control spring therein supporting said valve piston, said valve piston including an inner fluid guide with said second throttle and piston surfaces spaced apart from one another and discharging into annuli in said valve housing, said annuli respectively connected in fluid communication to a pressure supply, said tank return line, said supply line and said additional feed line.

5. A controlling device according to claim 1 wherein a continuously throttle relief line is connected to said tank return line and said supply line.

6. A controlling device according to claim 4 wherein said valve piston is movable in said valve housing along a control stoke against said control spring for pressure limitation to connect said supply line to said additional feed line upon exceeding a definable pressure level.

7. A controlling device according to claim 1 wherein first and second feed valves are connected in fluid communication in said supply line and are connected to and controlling respective utility parts of a hydraulic consumer individually; and at least one second control valve has an output side connected to connecting lines of said feed valves and an input side connected to a fluid supply and to said additional feed line.

8. A controlling device according to claim 1 wherein said first control valve is a compensator.

9. A controlling device according to claim 8 wherein said compensator is a 4/3 directional control proportional valve; and said second control valve is a 4/3 directional control valve.

10. A controlling device for hydraulic consumers, comprising:

at least one first control valve in a supply line in fluid communication with at least one hydraulic consumer, said first control valve having a valve piston therein with a control edge;

a tank return line in fluid communication with said control valve;

an additional feed line connected to said first control valve, said first control valve operating as a priority valve such that said supply line acquires preference of fluid supply relative to said tank return line; and a second feed line with a second throttle in said first control valve, said control edge regulating free fluid flow through said second feed line.

11. A controlling device according to claim 10 wherein said first control valve is connected to a fluid supply via a first throttle.

12. A controlling device according to claim 10 wherein said first control valve comprises a valve housing and a control spring therein supporting said valve piston, said valve piston including an inner fluid guide with said second throttle and piston surfaces spaced apart from one another and discharging into annuli in said valve housing, said annuli respectively connected in fluid communication to a pressure supply, said tank return line, said supply line and said additional feed line.

13. A controlling device according to claim 10 wherein a continuously throttle relief line is connected to said tank return line and said supply line.

14. A controlling device according to claim 12 wherein said valve piston is movable in said valve housing along a control stoke against said control spring for pressure limitation to connect said supply line to said additional feed line upon exceeding a definable pressure level.

15. A controlling device according to claim 10 wherein first and second feed valves are connected in fluid communication in said supply line and are connected to and controlling respective utility parts of a hydraulic consumer individually; and at least one second control valve has an output side connected to connecting lines of said feed valves and an input side connected to a fluid supply and to said additional feed line.

16. A controlling device according to claim 10 wherein said first control valve is a compensator;

said compensator is a 4/3 directional control proportional valve; and said second control valve is a 4/3 directional control valve.

17. A controlling device for hydraulic consumers, comprising:

at least one first control valve in a supply line in fluid communication with at least one hydraulic consumer, said first control valve being compensator and a 4/3 directional control proportional valve;

a tank return line in fluid communication with said control valve;

an additional feed line connected to said first control valve, said first control valve operating as a priority valve such that said supply line acquires preference of fluid supply relative to said tank return line;

first and second feed valves connected in fluid communication in said supply line and connected to and controlling respective utility parts of a hydraulic consumer individually;

at least one second control valve having all output side connected to connecting lines of said feed valves and an input side connected to a fluid supply and to said additional feed line, said second control valve being a 4/3 directional control valve.

18. A controlling device according to claim 17 wherein said first control valve is connected to a fluid supply via a first throttle.

19. A controlling device according to claim 17 wherein said first control valve comprises a second feed line with a second throttle and a valve piston therein with a control edge regulating free fluid flow through said second feed line.

20. A controlling device according to claim 19 wherein said first control valve comprises a valve housing and a control spring therein supporting said valve piston, said valve piston including an inner fluid guide with a third throttle site and piston surfaces spaced apart from one another and discharging into annuli in said valve housing, said annuli respectively connected in fluid communication to a pressure supply, said tank return line, said supply line and said additional feed line.

21. A controlling device according to claim 17 wherein continuously throttle relief line is connected to said tank return line and said supply line.

22. A controlling device according to claim 20 wherein said valve piston is movable in said valve housing along a control stoke against said control spring for pressure limitation to connect said supply line to said additional feed line upon exceeding a definable pressure level.

* * * * *